United States Patent
Kruse et al.

(10) Patent No.: US 12,242,392 B2
(45) Date of Patent: Mar. 4, 2025

(54) METHODS AND APPARATUS TO ESTIMATE CONSUMED MEMORY BANDWIDTH

(71) Applicant: Texas Instruments Incorporated, Dallas, TX (US)

(72) Inventors: Patrick Kruse, Richmond, TX (US); Gregory Shurtz, Houston, TX (US); Denis Beaudoin, Rowlett, TX (US); Abhishek Shankar, Sugar Land, TX (US); Daniel Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 213 days.

(21) Appl. No.: 17/892,693

(22) Filed: Aug. 22, 2022

(65) Prior Publication Data

US 2023/0401164 A1 Dec. 14, 2023

Related U.S. Application Data (60) Provisional application No. 63/350,456, filed on Jun. 9, 2022.

(51) Int. Cl.
*G06F 13/16* (2006.01)
*G06F 12/14* (2006.01)

(52) U.S. Cl.
CPC ...... *G06F 12/1416* (2013.01); *G06F 13/1668* (2013.01); *G06F 2212/1052* (2013.01)

(58) Field of Classification Search
CPC ............. G06F 12/1416; G06F 13/1668; G06F 2212/1052
USPC ........................................................ 711/171
See application file for complete search history.

(56) References Cited

U.S. PATENT DOCUMENTS

| | | | |
|---|---|---|---|
| 9,892,066 B1* | 2/2018 | Dodson | G06F 3/0653 |
| 10,838,884 B1* | 11/2020 | Magudilu Vijavaraj | |
| | | | G06F 13/161 |
| 2004/0158677 A1* | 8/2004 | Dodd | G06F 12/0215 |
| | | | 711/E12.004 |
| 2004/0193822 A1* | 9/2004 | Kareenahalli | G06F 1/3275 |
| | | | 711/167 |
| 2014/0108740 A1* | 4/2014 | Rafacz | G06F 12/0862 |
| | | | 711/137 |
| 2019/0146684 A1* | 5/2019 | Benisty | G06F 13/4282 |
| | | | 711/102 |
| 2019/0179757 A1* | 6/2019 | Walker | G06F 11/3027 |
| 2019/0213130 A1* | 7/2019 | Madugula | G06F 12/0895 |

(Continued)

OTHER PUBLICATIONS

Heinanen et al., "A Two Rate Three Color Marker," Internet community memo, University of Pennsylvania, Sep. 1999, 5 pages.

*Primary Examiner* — Christopher B Shin
(74) *Attorney, Agent, or Firm* — Xianghui Huang; Frank D. Cimino (57) ABSTRACT

An example apparatus includes: bandwidth estimator circuitry configured to: obtain a first memory transaction; and determine a consumed bandwidth associated with the memory transaction; and gate circuitry configured to: permit transmission of the memory transaction to a memory controller circuitry; determine whether to gate a second memory transaction generated by a source of the first memory transaction based on the consumed bandwidth of the first memory transaction; and when it is determined to gate the second memory transaction, prevent transmission of the second memory transaction for an amount of time based on the consumed bandwidth.

20 Claims, 6 Drawing Sheets

(56) References Cited

U.S. PATENT DOCUMENTS

| | | | |
|---|---|---|---|
| 2020/0210332 A1* | 7/2020 | Steiner | G06F 11/3495 |
| 2021/0157651 A1* | 5/2021 | Duluk, Jr. | G06T 1/20 |
| 2023/0060804 A1* | 3/2023 | Zhu | G06F 1/206 |
| 2023/0259300 A1* | 8/2023 | Hsu | G11C 16/26 |
| | | | 711/154 |

* cited by examiner

METHODS AND APPARATUS TO ESTIMATE CONSUMED MEMORY BANDWIDTH

CROSS-REFERENCE TO RELATED APPLICATION

This patent application claims the benefit of and priority to U.S. Provisional Patent Application Ser. No. 63/350,456 filed Jun. 9, 2022, which application is hereby incorporated herein by reference in its entirety.

TECHNICAL FIELD

This description relates generally to memory, and more particularly to methods and apparatus to estimate consumed memory bandwidth.

BACKGROUND

Many computer architecture designs include computing systems that rely on a shared resource. For example, some computer architecture designs may include one or more processor cores that are each capable of executing machine readable instructions. To execute the machine readable instructions, each of the processor cores may read to and write from shared memory circuitry. In many examples, the processor cores may utilize the same communication system, also known as a bus, to access the memory circuitry.

SUMMARY

For methods and apparatus to estimate consumed bandwidth, an example device includes bandwidth estimator circuitry configured to: obtain a first memory transaction; and determine a consumed bandwidth associated with the memory transaction; and gate circuitry configured to: permit transmission of the memory transaction to a memory controller circuitry; determine whether to gate a second memory transaction generated by a source of the first memory transaction based on the consumed bandwidth of the first memory transaction; and when it is determined to gate the second memory transaction, prevent transmission of the second memory transaction for an amount of time based on the consumed bandwidth.

BRIEF DESCRIPTION OF THE DRAWINGS

The same reference numbers or other reference designators are used in the drawings to designate the same or similar (functionally and/or structurally) features.

DETAILED DESCRIPTION

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

A bus may include various hardware connections and use various communication protocols depending on the computer architecture design. Regardless of their composition, buses are composed of a finite amount of resources. As such, there is a maximum amount of data that a bus is capable of transferring between components connected to the bus in a given amount of time. In some examples, the maximum amount of data per unit of time supported by a bus is referred to as the bus bandwidth.

An important aspect of computer architecture design is ensuring that the bus bandwidth is correctly utilized by the processor cores. For example, manufacturers may determine the rate at which data from a given processor core is transmitted to the memory circuit based on the type of processor core, type of bus, type of memory circuit, and total number of processor cores within the system that use the bus. In many examples, software applications executed by the processor cores may perform operations based on the assumption that data transfer between a given source and a memory will always occur at the rate determined by the manufacturer for the given source. Therefore, if a first processor core transfers data at a higher rate (e.g., uses more bandwidth) than a manufacturer intended, data coming to and from a second processor core may be transferred over the bus at a lower than intended rate. As a result, a software application running on the second processor core may behave unexpectedly and/or produce errors. In some examples, a processor core may be referred to as a transaction source.

Rather than providing each transaction source direct access to memory, many computer architectures utilize a memory controller that receives memory transactions from the multiple transaction sources and routes the memory transaction to memory. As used herein, a memory transaction refers to a request that is sent by a transaction source to the memory controller. In a memory transaction, the transaction source requests that the memory controller read an amount of data from memory or write an amount of data to memory. In some examples, a memory controller may be referred to as overloaded when the memory controller receives memory transactions over a bus at a rate faster than the controller can process the transactions. Like an overutilized bus, an overloaded memory controller may occur when a transaction source uses more than an intended share of bandwidth to transmit memory transactions. Similarly, an overloaded memory controller may lead to software applications that behave unexpectedly and/or produce errors.

Some computer architectures seek to avoid memory controller overload and bus overutilization by throttling individual transaction sources for a given amount of time. When a transaction source is throttled, its ability to transmit memory transactions over a bus may be reduced or eliminated, therefore enabling the bus bandwidth to be utilized by other transaction sources. Ideally, if all transaction sources accessing a bus are throttled correctly, the memory controller can sustainably respond to the memory transactions without becoming overloaded and each source will experience data transfer at the rate pre-determined by the manufacturer.

Previous solutions to throttle transaction sources may determine the amount of time each source should be throttled based on a transacted bandwidth. As used herein, a transacted bandwidth is associated with the amount of data to be read from or written to memory by a memory transaction. This may be specified by the data source in the memory transaction or determined based on the amount of data contained in the memory transaction. However, in many examples, transacted bandwidth is not an accurate representation of the actual amount of data that a memory controller reads from or writes to from memory when processing a memory transaction. For example, a first write transaction that specifies 64 bytes of data may align with a memory boundary and consume less bandwidth than a second write transaction that specifies 64 bytes of data but is not aligned and therefore entails two partial writes to the memory. Therefore, a previous solution that throttles based on transacted bandwidth may underestimate the amount of time a given transaction source should be throttled. As a result, in some previous solutions, a memory controller may become overloaded due to differences between the throttle time of a processor core and the actual time it takes a memory controller to process the memory transaction.

Example methods, systems, and apparatus disclosed herein determine whether to throttle transaction sources based on a consumed bandwidth as opposed to a transacted bandwidth. As used herein, a consumed bandwidth is associated with the amount of data that a memory controller reads to or writes from memory when processing a memory transaction. Example systems that throttle based on consumed bandwidth may estimate memory controller processing time more accurately than previous solutions due to the consideration of factors that may include but are not limited to memory burst size, address alignment, error correction codes (ECCs), partial writes, etc. As a result, examples disclosed herein decrease the odds that a memory controller becomes overloaded or that a bus becomes overutilized when compared to previous solutions.

Figure 1:
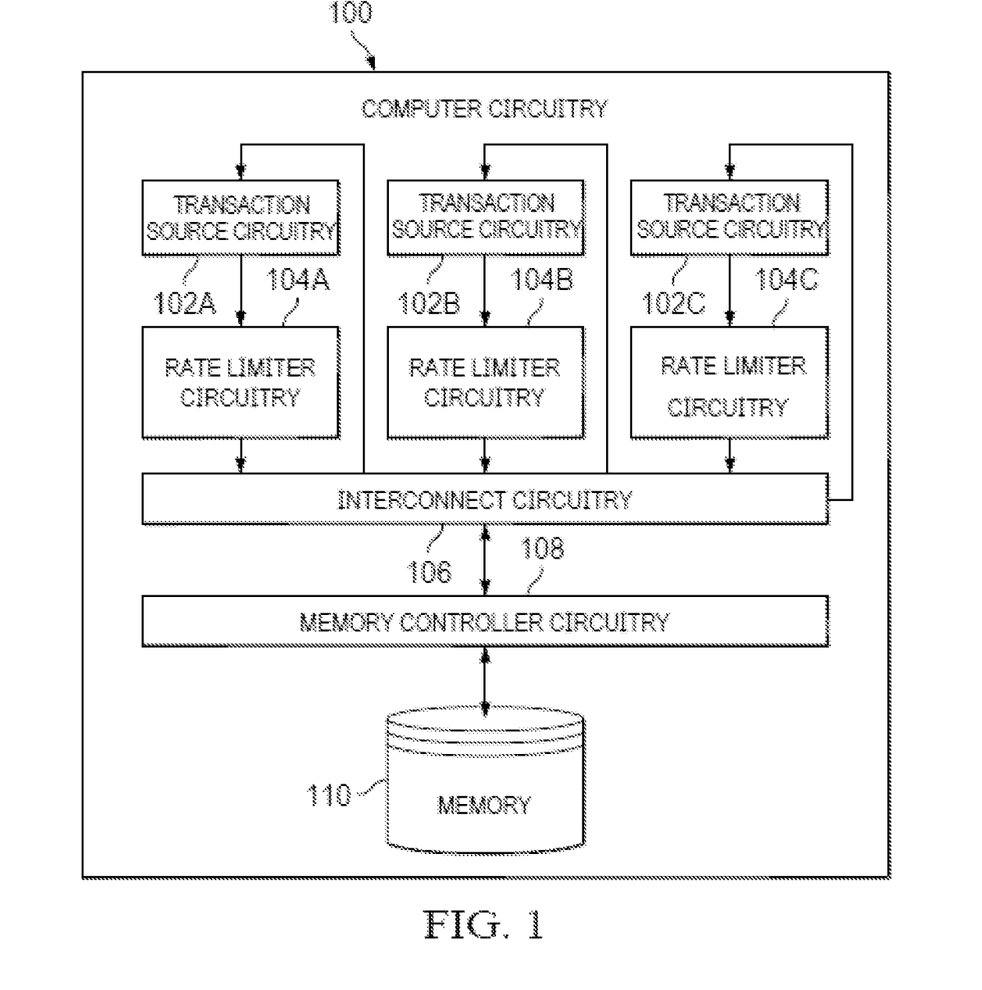
FIG. 1 is an example block diagram of computer circuitry.

FIG. 1 is an example block diagram of computer circuitry. The example computer circuitry 100 includes example transaction source circuitry 102A, 102B, 102C, example rate limiter circuitry 104A, 104B, 104C, example interconnect circuitry 106, example memory controller circuitry 108, and example memory 110.

The example transaction source circuitry 102A, 102B, 102C generate memory transactions. Each of the example transaction source circuitry 102A, 102B, 102C may generate any number of memory transactions within a given time period. In some examples, the transaction source circuitry 102A, 102B, 102C may generate memory transactions independently of one another. In other examples, the transaction source circuitry 102A, 102B, 102C may communicate with one another to generate memory transactions in a particular sequence. In some examples, each of the example transaction source circuitry 102A, 102B, 102C may be referred to as an intellectual property core. While the example block diagram of FIG. 1 illustrates three instances of transaction source circuitry, in other examples, the example computer circuitry 100 may implement a different number of transaction source circuits.

The example rate limiter circuitry 104A, 104B, 104C throttles memory transactions generated by the corresponding transaction source circuitry 102A, 102B, 102C according to the teachings of this disclosure. In FIG. 1, the example computer circuitry 100 implements one rate limiter circuitry 104A, 104B, 104C for each of the example transaction source circuitry 102A, 102B, 102C. In other examples, the example computer circuitry 100 may implement a rate limiter circuit that is shared by multiple transaction source circuits. In other examples, the example computer circuitry 100 may additionally implement a transaction source circuit that is not throttled by a corresponding rate limiter circuit. The example rate limiter circuitry 104A, 104B, 104C determines how long to throttle a given memory transaction by estimating a consumed memory bandwidth. The example rate limiter circuitry 104A, 104B, 104C is discussed further in connection with FIG. 2.

The example interconnect circuitry 106 is a communication system used to exchange data between the components of the example computer circuitry 100. For example, any of the rate limiter circuitry 104A, 104B, 104C may transmit a memory transaction to the example memory controller circuitry 108 via the interconnect circuitry 106. Furthermore, after processing the memory transaction, the example memory controller circuitry 108 may provide response data to the corresponding transaction source circuitry 102A, 102B, 102C via the interconnect circuitry 106. The example interconnect circuitry 106 may be implemented using any communication system that meets pre-determined threshold power and latency requirements. In some examples, the example interconnect circuitry 106 may implement communication protocols that include, but are not limited to, the Texas Instruments® Common Bus Architecture (CBA) protocol, Open Core Protocol (OCP), Advanced Extensible Interface (AXI), etc.

The example memory controller circuitry 108 receives memory transactions from each of the rate limiter circuitry 104A, 104B, 104C. The example memory controller circuitry 108 processes the memory transactions by either reading data from or writing data to the example memory 110. In some examples, after processing the memory transaction from a particular source (e.g., transaction source circuitry 102A), the example memory controller circuitry 108 may provide response data to the source. Response data may include, for example, an amount of data read from the memory 110, a confirmation that data within the memory transaction has successfully been written into memory, etc. The example memory controller circuitry 108 may perform multiple reads, multiple writes, and other operations to process a single memory transaction. The example memory controller circuitry 108 is discussed further in connection with FIG. 3.

The example memory 110 stores data used by the example transaction source circuitry 102A, 102B, 102C. The example memory 110 may store any amount of data and may be implemented by any form of memory. Additionally, the memory 110 may only provide access to data as part of a block of addresses, as opposed to other memory circuits that that may provide access to a single memory address upon request.

The example computer circuitry 100 includes rate limiter circuitry 104A, 104B, 104C to manages the rate at which the example memory controller circuitry 108 receives memory transactions, thereby preventing bus overutilization and/or memory controller overloading. Advantageously, the example rate limiter circuitry 104A, 104B, 104C throttles the respective transaction source circuitry 102A, 102B, 102C based on a consumed bandwidth, which is a more accurate representation of the amount of data a memory controller reads or writes from memory than the transacted bandwidth used by previous solutions. Consumed bandwidth is discussed further in connection with FIG. 3.

Figure 2:
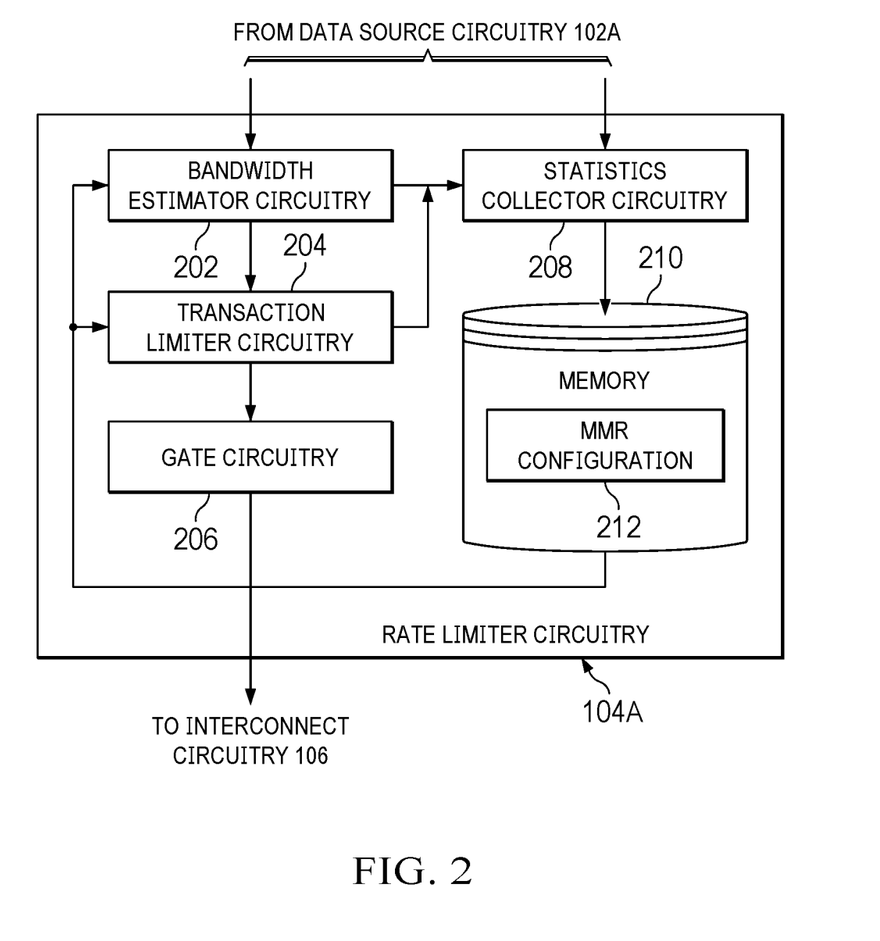
FIG. 2 is an example block diagram of the rate limiter circuitry of FIG. 1.

FIG. 2 is an example block diagram of the rate limiter circuitry of FIG. 1. The rate limiter circuitry 104A, 104B, 104C includes example bandwidth estimator circuitry 202, example transaction limiter circuitry 204, example gate circuitry 206, example statistics collector circuitry 208, and example memory 210. The example memory 210 includes a Memory Mapped Registers (MMR) configuration section 212. Furthermore, while the example block diagram of FIG. 2 illustrates the rate limiter circuitry 104A for simplicity, other rate limiter circuitry 104B, 104C, . . . , 104-n implemented by the computer circuitry 100 may include the same components illustrated in FIG. 2 and functionality described herein.

The example bandwidth estimator circuitry 202 receives memory transactions from the example transaction source circuitry 102A. The example bandwidth estimator circuitry 202 estimates a consumed bandwidth for each memory transaction it receives. To determine the consumed bandwidth, the example bandwidth estimator circuitry 202 may parse the memory transaction to determine information regarding the type of requested operation (e.g., a read or a write), the memory address that the requested operation begins, the transacted bandwidth, etc. This transaction information may be used to determine a consumed bandwidth for the transaction. The example bandwidth estimator circuitry 202 may also use information from the example MMR configuration section 212 to estimate the consumed bandwidth.

The consumed bandwidth value produced by the example bandwidth estimator circuitry 202 is considered an estimation because, in some examples, the exact amount of data used by the memory controller circuitry 108 to process a memory transaction may be different than consumed bandwidth value. For example, if a different source not affiliated with the rate limiter circuitry 104A causes the memory controller circuitry 108 to read a section of ECC data immediately before an example memory transaction needs to read the same ECC data, the example bandwidth estimator circuitry 202 may be unaware that the memory controller circuitry 108 stored the necessary ECC data in its cache and may inadvertently estimate additional bandwidth for the example memory transaction that will not be consumed. However, in many cases, the consumed bandwidth estimator circuitry 202 does correctly predict the exact amount of data used by the memory controller circuitry 108 to process a memory transaction. The example bandwidth estimator circuitry 202 is described further in connection with FIG. 3.

The consumed bandwidth may determine whether the transaction source circuitry 102A should be throttled, and, when throttled, the example transaction limiter circuitry 204 determines an amount of time that the example transaction source circuitry 102A should be throttled for. To calculate the amount of time, the example transaction limiter circuitry 204 uses the consumed bandwidth and information within the example memory 210. For example, the example transaction limiter circuitry 204 may access the memory 210 to determine an allocated bandwidth value, a number of bytes that the example memory controller circuitry 108 can process per clock cycle, etc. The bytes per clock cycle value may be stored in the example MMR configuration section 212. The example transaction limiter circuitry 204 also uses the calculated throttle time to determine whether to change the state of the gate circuitry 206.

The example gate circuitry 206 has an open state and a closed state. When in the open state, the example gate circuitry 206 forwards any memory transaction it receives to the interconnect circuitry 106. When in the closed state, the example gate circuitry 206 prevents memory transactions generated by the transaction source circuitry 102A from being transmitted on the interconnect circuitry 106. The example gate circuitry 206 changes between the open state and the closed state based on instructions from the example transaction limiter circuitry 204.

The example statistics collector circuitry 208 obtains information that may be used to evaluate the performance of the example rate limiter circuitry 104A. Such information may include the memory transaction, a corresponding consumed bandwidth, and the corresponding throttle time. The example statistics collector stores the obtained data in the example memory 210.

The example memory 210 stores information obtained by the statistics collector circuitry 208. The example memory 210 also stores the MMR configuration section 212. The MMR configuration section 212 includes data used by the bandwidth estimator circuitry 202 and transaction limiter circuitry 204. For example, data within the MMR configuration section 212 may include, but is not limited to, the number of bytes the memory controller circuitry 108 can process per clock cycle, the burst size of the example memory 110, an allocated memory controller utilization of the example transaction source circuitry 102A, etc. As used above and herein, burst size refers to the minimum amount of data that the memory controller circuitry must read or write to the example memory 110 to process a memory transaction.

In some examples, data within the example MMR configuration section 212 may be predetermined by a manufacturer. Additionally or alternatively, data within the example MMR configuration section 212 may be determined by an operating system or other system level software application of the computer circuitry 100. For example, a system level software application may determine that the transaction source circuitry 102A is only permitted to transmit a certain number of bytes per unit of time to the memory controller circuitry 108 via the interconnect circuitry 106. As used above and herein, the number of bytes per unit of time that a transaction source circuitry is permitted to send to the memory controller circuitry 108 is referred to as an allocated bandwidth. The system level software application may determine allocated bandwidth based on a prioritization of the transaction source circuitry 102A relative to the other transaction source circuitry 102B, 102C, . . . , 102-n implementations, the compute resources available to the components within the computer circuitry 100. The allocated bandwidth of transaction source circuitry 102A may be stored in the MMR configuration section 112 and may be enforced by the transaction limiter circuitry 204 of the corresponding rate limiter circuitry 104A.

When the example transaction source circuitry 102A begins to generate memory transactions, the example gate circuitry 206 may begin in an open state. When a first memory transaction is generated, the transaction limiter circuitry 204 may determine that the size of the first memory transaction is greater than the number of bits described in the allocated bandwidth. In such examples, after the gate circuitry 206 forwards the first memory transaction to the example memory controller circuitry 108, the transaction limiter circuitry 204 changes the state of the gate circuitry 206 from opened to closed. The transaction limiter circuitry 204 may change the state of the gate circuitry 206 from closed to open after the throttle time has passed. In doing so, when the example transaction source circuitry 102A transmits the first memory transaction to the example memory controller circuitry 108, it must wait for the throttle time to pass before transmitting a second memory transaction to the memory controller circuitry 108. The actual bandwidth used by the example transaction source circuitry 102A for the first memory transaction can be calculated by dividing the number of bytes in the first memory transaction by the total number of clock cycles (i.e., the number of clock cycles spent transmitting the memory transaction added to a number of clock cycles corresponding to the throttle time). Because the rate limiter circuitry 104A introduces the throttle time, the actual bandwidth used by the example transaction source circuitry 102A may not exceed the allocated bandwidth.

Advantageously, the example transaction limiter circuitry 204 calculates the throttle tine based on the consumed bandwidth rather than a transacted bandwidth. As a result, after an example memory transaction is sent, the example rate limiter circuitry 104A may throttle the example transaction source circuitry 102A for an amount of time that is more representative of how long the memory controller circuitry 108 takes to process the example memory transaction than previous solutions. In doing so, the example rate limiter circuitry 104A, 104B, 104C improve the performance of the example computer circuitry 100 by reducing the likelihood that the example memory controller circuitry 108 becomes overloaded.

Figure 3:
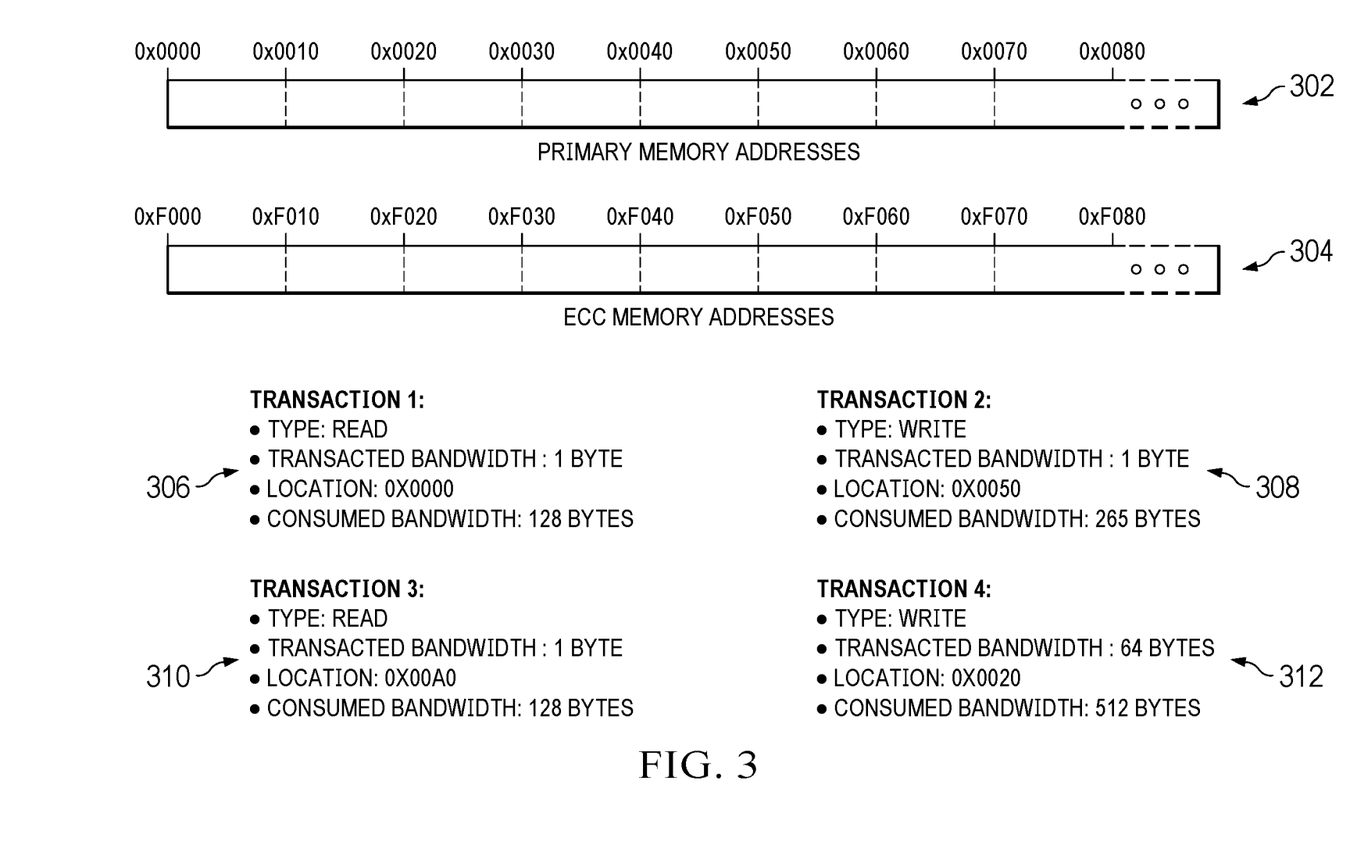
FIG. 3 is an illustrative example of consumed bandwidth estimation as determined by the bandwidth estimator circuitry of FIG. 2.

FIG. 3 is an illustrative example of consumed bandwidth estimation as determined by the bandwidth estimator circuitry of FIG. 2. FIG. 3 includes example primary memory addresses 302, example ECC memory addresses 304, an example first transaction 306, an example second transaction 308, an example third transaction 310, and an example fourth transaction 312.

The example primary memory addresses 302 are a set of addresses within the example memory 110. For example, FIG. 3 illustrates the example primary memory addresses 302 as 0x0000 to 0x0080, were each hexadecimal value is a memory address that stores a byte of data. The example primary memory addresses 302 refers to the portion(s) of memory that may be listed in a memory transaction generated by the example transaction source circuitry 102A, 102B, 102C. While only 128 memory addresses are illustrated in the example primary memory addresses 302 of FIG. 3, in practice, the example primary memory addresses 302 may be any size. Furthermore, FIG. 3 illustrates the primary memory addresses 302 as continuous for simplicity. In some examples, the primary memory addresses 302 may be discontinuous.

The example ECC memory addresses 304 are a set of addresses within the example memory 110 that are separate from the example primary memory addresses 302. For example, FIG. 3 illustrates the example ECC memory addresses 304 as 0xF000 to 0xF080. The example ECC memory addresses 304 refers to the portion(s) of memory that are used by the memory controller circuitry 108 to identify and/or correct error codes from the received memory transaction.

The example first transaction 306 is a first memory transaction received by the memory controller circuitry 108. The memory transaction may be from any of the transaction source circuitry 102A, 102B, 102C implementations. Upon parsing the first transaction 306, the example bandwidth estimator circuitry 202 determines the memory transaction is a read operation with a transacted bandwidth of 1 byte and a location of 0x0000. That is, the transaction source circuitry that generated the first transaction 306 requests the memory controller circuitry 108 read the value of a byte that begins at 0x0000 and ends at 0x0001, and that the memory controller circuitry 108 provide the value to the transaction source circuitry.

Because the example memory 110 only provides access to groups of adjacent addresses, the memory controller circuitry 108 is unable to obtain the byte that begins at 0x0000 and ends at 0x0001 by itself. Instead, the example memory controller circuitry 108 is required to obtain a group of bytes in a burst. For example, if the example memory 110 has a burst size of 64 bytes, the example memory controller circuitry 108 obtains 64 bytes from 0x0000 to 0x0040. Furthermore, memory transactions may be subjected to transmission error when sent over the interconnect circuitry 106. Transmission errors include but are not limited to bit interleaving, bit corruption, bit loss, etc. To identify and/or correct any transmission errors that exist within the example first transaction 306, the example memory controller circuitry 108 requires additional information outside of the memory transaction. Namely, the memory controller circuitry 108 may access data stored in the ECC memory addresses 304 each time a memory transaction is received to identify and/or correct transmission errors. While the amount of ECC data required to identify and/or correct transmission errors for a single memory transaction may vary on the types of errors, type of memory transaction, etc., the amount of ECC data obtained from the example memory 110 has a lower limit of the memory burst size. For example, the memory controller circuitry 108 may obtain bytes between 0xF000 and 0xF040 to obtain ECC data for the example first transaction 306. The example bandwidth estimator circuitry 202 accounts for both 64 byte burst reads to determine the example first transaction 306 has a consumed bandwidth of 128 bytes.

The example second transaction 308 is a second memory transaction received by the memory controller circuitry 108. The memory transaction may be from any of the transaction source circuitry 102A, 102B, 102C implementations. Upon parsing the second transaction 308, the example bandwidth estimator circuitry 202 determines the memory transaction is a write operation with a transacted bandwidth of 1 byte and a location of 0x0050. That is, transaction source circuitry included 1 byte of data within the second transaction 308, and the memory controller circuitry 108 is instructed to store the byte of data between 0x0050 and ends at 0x0051.

Like the first transaction 306, the example memory controller circuitry 108 requires two bursts to access the data necessary to process the example second transaction 308. Specifically, the example memory controller circuitry 108 obtains bytes 0x0040 through 0x00080 from the primary memory addresses 302 and bytes 0xF040 through 0xF080 from the ECC memory addresses 304. The example memory controller circuitry 108 then modifies the both sections of data. The modifications store the 1 byte of data described in the second transaction 308 and update the corresponding ECC data to reflect the changes between 0x0050 and 0x0051. To finish processing the second transaction 308, the example memory controller circuitry 108 requires two additional bursts to write the modified sections of data into memory 110 for storage. The example bandwidth estimator circuitry 202 accounts for the four total 64 byte bursts to determine the example second memory transaction 308 has a consumed bandwidth of 265 bytes.

The example third transaction 310 is a third memory transaction received by the memory controller circuitry 108.

The memory transaction may be from any of the transaction source circuitry 102A, 102B, 102C implementations. Upon parsing the third transaction 310, the example bandwidth estimator circuitry 202 determines the memory transaction is a read operation with a transacted bandwidth of 1 byte and a location of 0x00A0. That is, the transaction source circuitry that generated the third transaction 310 requests the memory controller circuitry 108 read the value of a byte that begins at 0x00A0 and ends at 0x0001, and that the memory controller circuitry 108 provide the value to the transaction source circuitry. Like the first transaction 306, the example memory controller circuitry reads a first section of memory from the primary memory addresses 302 (0x0080 through 0x00C0) and a second section of memory from the ECC memory addresses 304 (0xF080 through 0xF0C0), so the example bandwidth estimator circuitry 202 determines a consumed bandwidth of 128 bytes.

The example fourth transaction 312 is a fourth memory transaction received by the memory controller circuitry 108. The memory transaction may be from any of the transaction source circuitry 102A, 102B, 102C implementations. Upon parsing the fourth transaction 312, the example bandwidth estimator circuitry 202 determines the memory transaction is a write operation with a transacted bandwidth of 64 bytes and a location of 0x0020. That is, transaction source circuitry included 64 bytes of data within the fourth transaction 312, and the memory controller circuitry 108 is instructed to store the bytes of data between 0x0020 and 0x0060.

In many examples, the example memory 110 may enforce burst boundaries. A burst boundary refers to specific addresses within the example memory 110, wherein the memory controller circuitry 108 can only read or write data between two consecutive burst boundaries in a single memory burst. For example, the burst boundaries of the example primary memory addresses 302 in FIG. 3 are 0x0000, 0x0040, 0x0080, 0x00C0, etc. Similarly, the burst boundaries for the example ECC memory addresses 304 in FIG. 3 are 0xF000, 0xF040, 0xF080, 0xF0C0, etc. Therefore, although the amount of data within the fourth transaction 312 is less than or equal to the burst size of the illustrative example of FIG. 3 (64 bytes), the relevant data crosses two burst boundaries and therefore requires four total burst operations to access. Specifically, the example memory controller circuitry 108 uses a first burst for 0x0000 through 0x0040, a second burst for 0x0040 through 0x0080, a third burst for 0xF000 through 0xF040, and a fourth burst for 0xF040 through 0xF080. In some examples, a memory transaction may be referred to as misaligned if the transacted bandwidth is less than or equal to the burst size and the referenced memory location crosses a burst boundary. To process the example fourth transaction 312, the example memory controller circuitry 108 may modify the four sections of data and write each of them back to memory 110. The example bandwidth estimator circuitry 202 accounts for the eight total 64 byte bursts to determine the example fourth memory transaction 312 has a consumed bandwidth of 512 bytes.

In the illustrated example of FIG. 3, the example first transaction 306 requires access to a different section of the ECC memory addresses 304 than the example second transaction 308. As a result, the memory controller circuitry 108 requires two separate bursts to access each respective section of memory. However, in some examples, the ECC data needed to process two consecutive memory transactions may be within the same section of data. The example consumed bandwidth determiner circuitry may determine the ECC data of a current memory transaction is in the same section as the previous memory transaction by accessing the previous memory transaction during the evaluation of the current memory transaction. The example statistics collector circuitry 208 memory transactions in the example memory 110 for future analysis.

When the example memory controller circuitry 108 obtains a section of ECC data from the example memory 110, it may store the data in an internal memory. In some examples, the internal memory of the example memory controller circuitry 108 may be referred to as a cache. Therefore, in examples where the ECC data needed to process two consecutive memory transactions are within the same section of data, the memory controller circuitry 108 does not require a burst to access the ECC memory addresses 304 during the second memory transaction because the memory controller circuitry 108 already has access to the relevant section from the first memory transaction. Accordingly, in such examples, the bandwidth estimator circuitry 202 would not include an ECC burst read when determining the consumed bandwidth of the second memory transaction. For example, if the second transaction 308 did not have a location of 0x0050, and instead requested a write operation located entirely between 0x0000 and 0x0040, the example bandwidth estimator circuitry 202 may have computed a consumed bandwidth of 192 bytes due to bytes 0xF000 through 0xF040 already being stored in the cache of the memory controller circuitry 108.

The example second transaction 308 and example fourth transaction 312 are examples of partial write operations. A partial write operation refers to when the data received in the memory transaction is not sufficient for the example memory controller circuitry 108 to calculate the corresponding new ECC values. A partial write operation may occur because the memory transaction may be misaligned with the example ECC memory addresses 304, or because the data in the memory transaction may include gaps. For example, communication protocols that include, but are not limited to, CBA, AXI, etc., may include a byte enable signal or similar signal. When a byte enable signal is low, a partial write may occur. A partial write operation may cause the memory controller circuitry 108 to read a block of data from the example primary memory addresses 302 (as described previously in connection with the example second transaction 308 and example fourth transaction 312) which, for example memory transactions that are not partial write operations, is not necessary.

In some examples, the example memory controller circuitry 108 may receive a memory transaction that is a full write operation. As used herein, a full write operation refers to any memory transaction with a write operation that is not a partial write. When the memory controller circuitry 108 receives a full write, the amount of data to be written is both aligned properly and sufficiently large that the example memory controller circuitry 108 can calculate the corresponding ECC value based on the transacted write data itself. As a result, in examples where the example memory controller circuitry 108 receives a memory transaction with a full write operation, a 64 byte burst to read data from the example primary memory addresses 302 is not required. Instead, the example memory controller circuitry 108 overwrites the old primary values in the example primary memory addresses 302 with new primary values obtained from the transacted write data. The example memory controller circuitry 108 also reads ECC values from the example ECC memory addresses 304, modifies the ECC data, and writes the new ECC data back as described previously, regardless of whether the transaction is a partial write operation or a full write operation. The example bandwidth estimator circuitry 202 determines whether a given memory transaction is a read operation, a partial write operation, or a full write operation, and estimates the consumed memory bandwidth accordingly.

The illustrative example of FIG. 3 illustrates how the example bandwidth estimator circuitry 202 determines consumed bandwidth for a memory transaction. The example first transaction 306, the example second transaction 308, the example third transaction 310, and the example fourth transaction 312 also illustrate how, in many examples, a transacted bandwidth can be magnitudes smaller than the consumed bandwidth. Advantageously, the example transaction limiter circuitry 204 determines throttle time based on the consumed bandwidth rather than the transacted bandwidth. In doing so, transaction source circuitry 102A, 102B, 102C are prevented from transmitting additional memory transactions for an amount of time that is more representative of the time required for the memory controller circuitry 108 to process a memory transaction than previous solutions.

Figure 4:
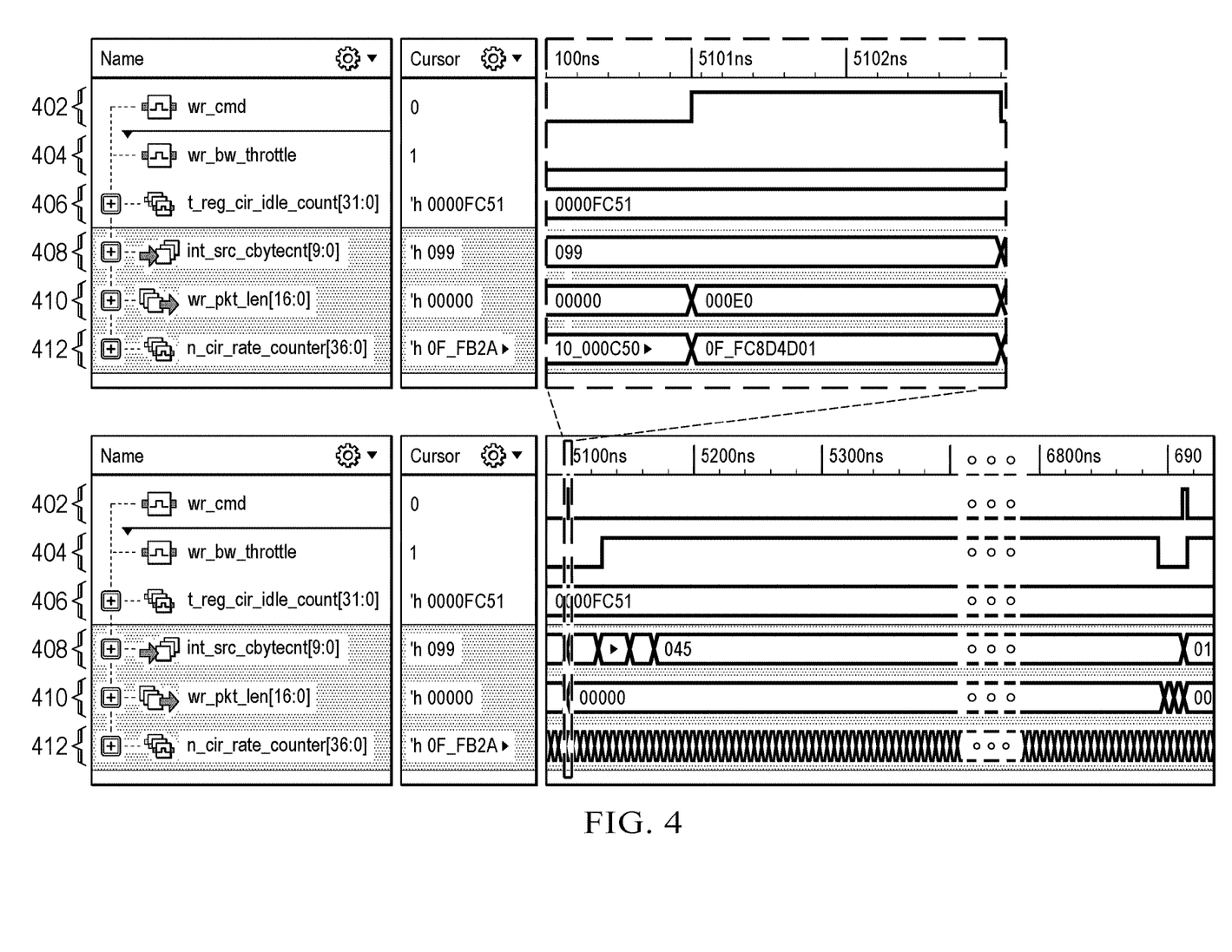
FIG. 4 is an illustrative example of simulation results of the rate limiter circuitry of FIG. 2.

FIG. 4 is an illustrative example of simulation results of the example rate limiter circuitry 104A of FIG. 1. FIG. 4 includes an example timeline 400, example command signal 402, an example throttle signal 404, an example idle count signal 406, an example byte count signal 408, an example packet length signal 410, and an example rate counter signal 412.

The example timeline 400 shows results of an example simulation of the example computer circuitry 100. The portion of the example timeline 400 between 5100 nanoseconds (ns) and 6950 ns is illustrated in FIG. 4. FIG. 4 also includes a zoomed in section of the example timeline from 5100 ns to 5103 ns for visual clarity.

The example command signal 402 indicates when a rate limiter circuitry 104A implementation transmits a memory transaction to the memory controller circuitry 108. The example command signal 402 includes a first memory transaction transmission at 5103 ns and a second memory transaction transmission at 6923 ns.

The example throttle signal 404 indicates the state of the example gate circuitry 206. For example, the example gate circuitry 206 is in the open state when the throttle signal 404 is low (i.e., a digital '0') and the example gate circuitry 206 is in the closed state when the throttle signal 404 is high (i.e., a digital '1'). The timeline 400 shows that example throttle signal 404 transitions from low to high at approximately 5101 ns and transitions from high to low at approximately 6875 ns.

The example idle count signal 406 indicates the allocated bandwidth for the transaction source circuitry 102A, and may provide a step size for a bandwidth-based counter. In the example simulation illustrated in FIG. 4, a system level software application (such as an operating system) determined the example transaction source circuitry 102A should not send more than approximately 0.25 bytes to the memory controller circuitry 108 each clock cycle. In the example simulation of FIG. 4, the programmed value of 0xFC51 corresponds to 0.25 bytes per clock cycle.

The example byte count signal 408 indicates the transacted bandwidth of a given memory transaction. From 5100 ns to 5103 ns, the example byte count signal 408 shows that the first memory transaction includes of 0x099 (153 in decimal) bytes of data to be written into the example memory 110.

The example packet length signal 410 indicates the estimated bandwidth of a given memory transaction. From 5101 ns to 5103 ns, the example packet length signal 410 shows that the consumed bandwidth is estimated to be 0x0E0 (224 in decimal) bytes of data.

The example rate counter signal 412 represents a counter value that may be used by the transaction limiter circuitry 204 to determine whether to change gate states. The example rate counter signal 412 may be at an original value before a memory transaction is transmitted. When the memory transaction is transmitted to the memory controller circuitry 108, the example rate counter signal 412 is decremented by the consumed bandwidth value. The example rate counter signal 412 then increments by the programmed value in the idle count signal 406 (e.g., 0xFC51 in FIG. 4) each clock cycle. When the example rate counter signal 412 is back to its original value, the example transaction limiter circuitry 204 instructs the example gate circuitry 206 to change from a closed state to an open state.

In the example simulation of FIG. 4, the transaction source circuitry 102A is throttled after the first memory transaction for 224/0.25=896 clock cycles. A conversion of units based on the clock speed of the example memory controller circuitry 108 used in the example simulation shows that the example rate limiter circuitry 104A throttled the transaction source circuitry 102A for 1820 ns.

The example simulation described in connected to FIG. 4 also includes a previous solution to throttle memory transactions. The previous solution, which is simulated to only use the transacted bandwidth as an input, throttled the transaction source circuitry 102A after the first memory transaction for 153/0.25=612 clock cycles. A conversion of units based on the clock speed of the example memory controller circuitry 108 used in the example simulation shows that the previous solutions throttled the transaction source circuitry 102A for 1380 ns.

The simulation of FIG. 4 shows that, in some examples, the example rate limiter circuitry 104A, 104B, 104C may throttle for longer periods of time than previous solutions. In some examples, the increased throttle time may reduce the risk of a memory controller becoming overloaded and/or a bus becoming overutilized.

Figure 5:
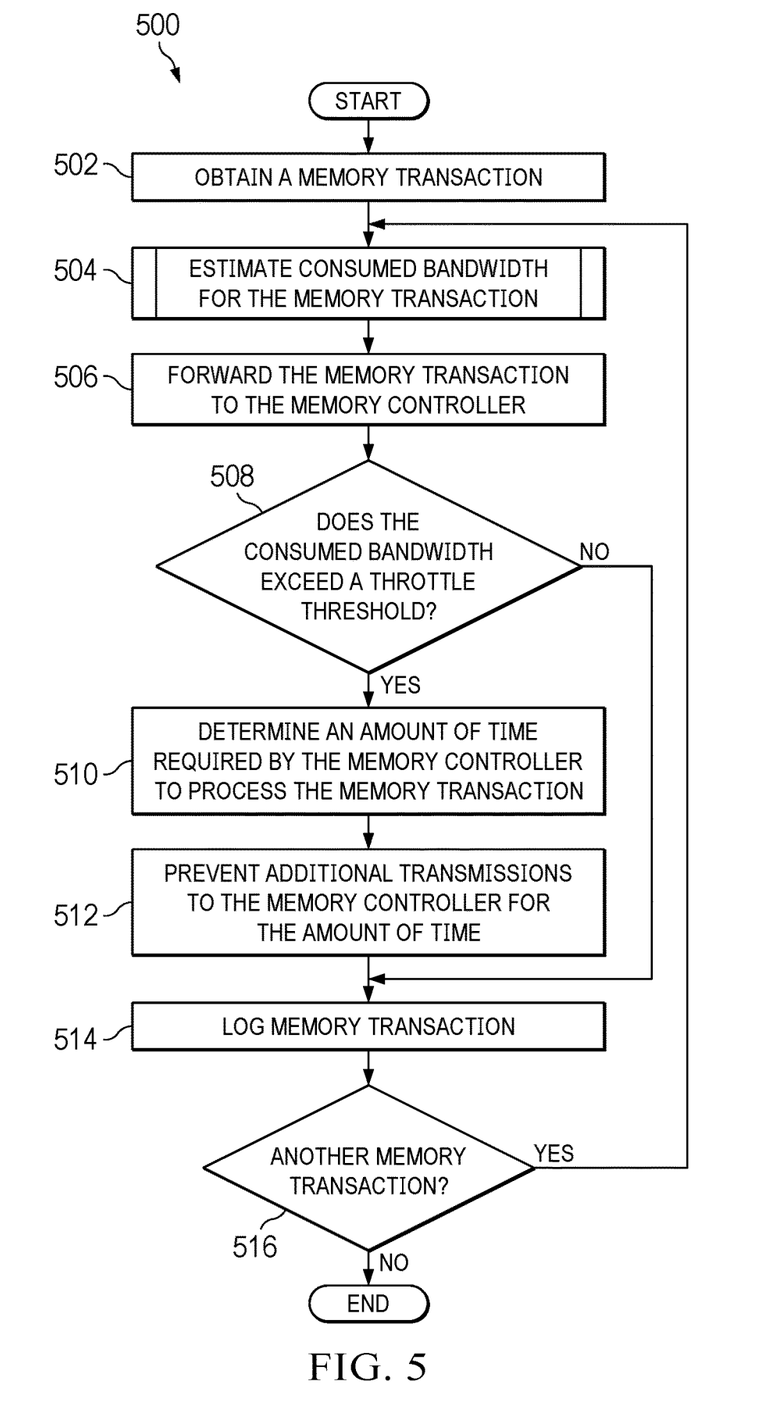
FIG. 5 is a flowchart representative of an example process that may be performed using machine readable instructions that can be executed and/or hardware configured to implement the rate limiter circuitry of FIG. 2, and/or, more generally, the computer circuitry of FIG. 1 to throttle memory transactions.

FIG. 5 is a flowchart representative of an example process that may be performed using machine readable instructions that can be executed and/or hardware configured to implement the rate limiter circuitry of FIG. 2, and/or, more generally, the computer circuitry of FIG. 1 to throttle memory transactions. While the example machine readable instructions and/or operations 500 describe one rate limiter circuitry 104A implementation for simplicity, the flowcharts of FIGS. 5, 6 may apply to any rate limiter circuitry 104B, 104C, ..., 104-n implementation. The example machine readable instructions and/or operations 500 begin when the example rate limiter circuitry 104A obtains a memory transaction from the transaction source circuitry 102A. (Block 502).

The example bandwidth estimator circuitry 202 estimates the consumed bandwidth for the memory transaction. (Block 504). The consumed bandwidth value represents a prediction of the amount of data the memory controller circuitry 108 will read and/or write to process the memory transaction of block 502. The prediction includes data used internally by the memory controller circuitry 108 and data exchanged between the memory controller circuitry 108 and the transaction source circuitry 102A. Block 504 is discussed further in connection with FIG. 6.

The example gate circuitry 206 forwards the memory transaction to the example memory controller circuitry 108. (Block 506). In examples where the gate circuitry 206 is in an open state when the example machine readable instructions and/or operations 500 begin, the example gate circuitry 206 may forward the memory transaction immediately after block 504. In other examples where the gate circuitry 206 is in a closed state when the example machine readable instructions and/or operations 500 begin, the example gate circuitry 206 may wait for instructions from the transaction limiter circuitry 204 to change to an open state before forwarding the memory transaction.

The example transaction limiter circuitry 204 determines whether the consumed bandwidth exceeds a threshold. (Block 508). The threshold of block 508 may refer to an allocated bandwidth value that a system level software application determines for the example transaction source circuitry 102A. To make the determination of block 508, the example transaction limiter circuitry 204 may compare the consumed bandwidth of block 504 to the allocated bandwidth of the transaction source circuitry 102A. If the example transaction limiter circuitry 204 determines the consumed bandwidth does not exceed the threshold (Block 508: No), the example machine readable instructions and/or operations proceed to block 514. When the estimated consumed bandwidth of block 504 does not exceed the threshold, the value of estimated consumed bandwidth is sufficiently small such that the transaction source circuitry 102A can immediately transmit an additional memory transaction without exceeding the allocated bandwidth.

As an example, suppose the allocated bandwidth for the example transaction source circuitry 102A is 500 bytes/millisecond (ms), the consumed bandwidth of block 504 is 400 bytes/ms, and the memory transaction is a first transaction generated by the transaction source circuitry 102A after being powered on. In such examples, the example estimated consumed bandwidth of block 504 does not exceed the threshold.

If the example transaction limiter circuitry 204 determines the consumed bandwidth does exceed the threshold (Block 508: Yes), the example transaction limiter circuitry 204 determines an amount of time based on the exceeded threshold. (Block 510). The example transaction limiter circuitry 204 makes the determination of 510 based on both the exceeded threshold and the consumed bandwidth. The amount of time determined in block 510 may be referred to as the throttle time.

In the foregoing example, suppose the transaction source circuitry 102A generates a second memory transaction at the same time as the first transaction, and that the second transaction has an estimated consumed bandwidth of 200 bytes. Because the example rate limiter circuitry 104A did not throttle the first transaction (Block 508: No during a first iteration of the flowchart of FIG. 5), there is no intentional delay between when the rate limiter circuitry 104A sends the first transaction (at block 506 of the first iteration of the flowchart of FIG. 5) and when the example rate limiter circuitry 104A sends the second transaction (at block 506 of a second iteration of the flowchart of FIG. 5). As such, after block 506 of the second iteration of the flowchart of FIG. 5 in the foregoing example, the rate limiter circuitry 104A has sent a total of 600 bytes in less than a millisecond. Therefore, in the foregoing example, the example transaction limiter circuitry 204 determines the consumed bandwidth of the second transaction has exceeded the threshold of 500 bytes/millisecond (at block 508 of the second iteration of the flowchart of FIG. 5). In the foregoing example, the example transaction limiter circuitry 204 then determines the amount of time (for block 510 of the second iteration of the flowchart of FIG. 5) to be 1.2 ms, as $$600 \text{ bytes} \times \frac{1 \text{ ms}}{500 \text{ bytes}} = 1.2 \text{ ms}.$$

The example gate circuitry 206 prevents additional transmissions to the example memory controller circuitry 108 for the amount of time determined in block 510. (Block 512). Specifically, the example gate circuitry 206 transitions from an open state to a closed state to prevent additional memory transactions generated by the example transaction source circuitry 102A from being transmitted.

In the foregoing example, the gate circuitry 206 is in a closed state for 1.2 ms (at block 512 of the second iteration of the flowchart of FIG. 5). As a result, the example rate limiter circuitry 104A sends only 600 bytes of estimated consumed memory bandwidth to the example memory controller circuitry 108 for the first 1.2 ms after the transaction source circuitry 102A is powered on. Therefore, the transaction source circuitry 102A meets its allocated bandwidth by sending, on average, 500 bytes/ms to the memory controller circuitry 108.

The example statistics collector circuitry 208 logs the memory transaction (Block 514). To log the memory transaction, the example statistics collector circuitry 208 may store the memory transaction in the example memory 210. The logged memory transaction may be used by the bandwidth estimator circuitry 202 to determine the consumed bandwidth of a subsequent memory transaction.

The example bandwidth estimator circuitry 202 determines whether there is another memory transaction from the transaction source circuitry 102A that requires transmission. (Block 516). The transaction source circuitry 102A may generate the additional memory transaction at any point during the machine readable instructions and/or operations 500. For example, the additional memory transaction may be generated concurrently with the memory transaction of block 502, may be generated while the gate circuitry is in the closed state at 512, etc. If the example bandwidth estimator circuitry 202 determines there is another memory transaction (Block 516: Yes), the example machine readable instructions and/or operations 500 proceed to block 504 where the example bandwidth estimator circuitry 202 estimates the consumed bandwidth of the additional memory transaction. If the example bandwidth estimator circuitry 202 determines there are no further memory transactions (Block 516: No), the example machine readable instructions and/or operations 500 end.

Figure 6:
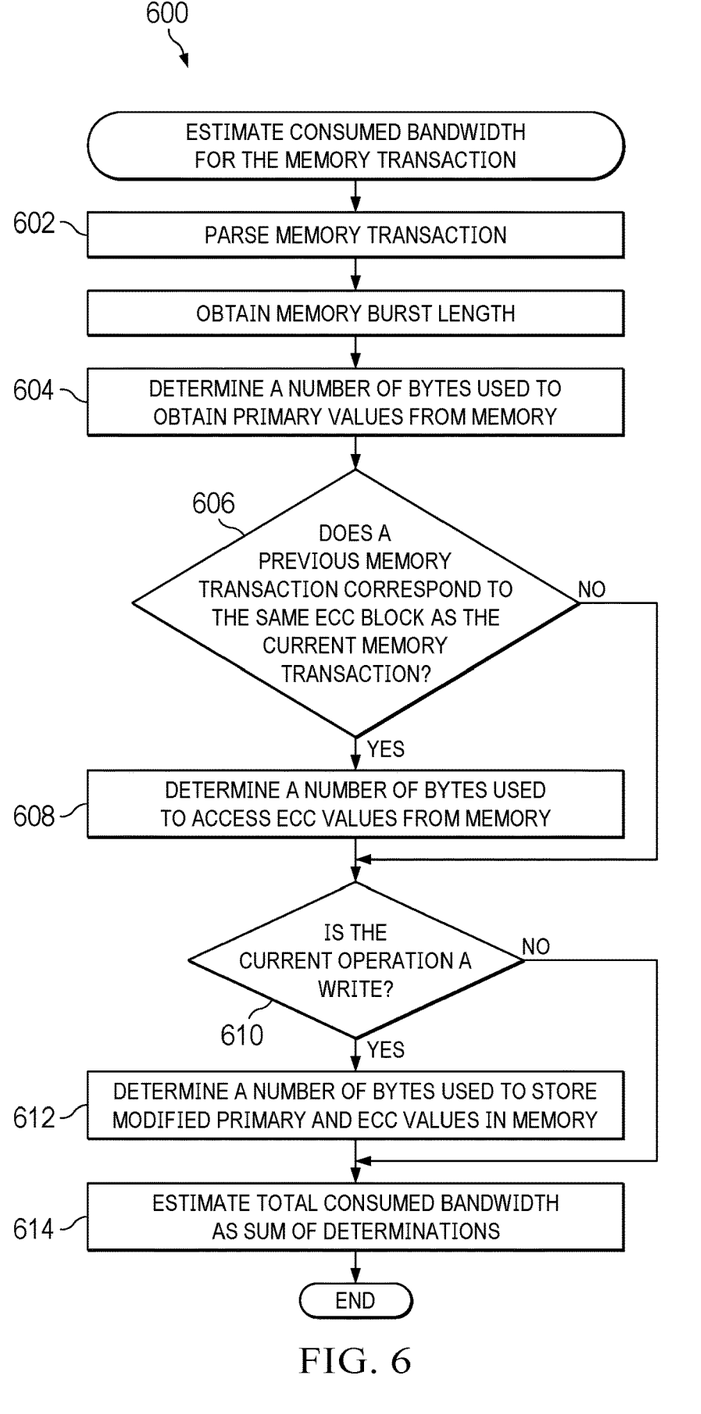
FIG. 6 is a flowchart representative of an example process that may be performed using machine readable instructions that can be executed and/or hardware configured to implement the rate limiter circuitry of FIG. 2, and/or, more generally, the computer circuitry of FIG. 1 to estimate consumed bandwidth as described in FIG. 5.

FIG. 6 is a flowchart representative of an example process that may be performed using machine readable instructions that can be executed and/or hardware configured to implement the rate limiter circuitry of FIG. 2, and/or, more generally, the computer circuitry of FIG. 1 to estimate consumed bandwidth as described in FIG. 5. Specifically, FIG. 6 describes how the example machine readable instructions and/or operations 500 implement block 504 of FIG. 5.

Execution of block 504 begins when the example bandwidth estimator circuitry 202 parses the memory transaction. (Block 602). By parsing the memory transaction, the example bandwidth estimator circuitry 202 may obtain information that may include, but is not limited to, the type of requested operation (e.g., a read or a write), the memory address range to be read from or written to, the transacted bandwidth, etc.

The example bandwidth estimator circuitry 202 obtains the memory burst length value. (Block 604). The memory burst length value refers to the minimum number of bytes that the example memory controller circuitry 108 can access from the example memory 110 in a memory burst. For example, the memory burst length in the illustrative example of FIG. 3 is 64 bytes. As used above and herein, a memory burst refers to when the memory controller circuitry 108 reads a section of data from memory 110 or writes a section of data to memory 110, where a section of data refers to the memory addresses between two consecutive burst boundaries.

The example bandwidth estimator circuitry 202 determines a number of bytes used by the memory controller circuitry 108 to obtain primary values from memory 110. (Block 606). Primary values refer to data stored in the sections of memory that are referenced in the current memory transaction. For example, primary values may be stored within the example primary memory addresses 302 of FIG. 3. The example bandwidth estimator circuitry 202 may make the determination of block 606 based on information that includes but is not limited to the memory address listed in the memory transaction of block 502, the memory burst length, and the burst boundaries of the primary memory values.

In one example of the determination of block 606, the example bandwidth estimator circuitry 202 uses a byte enable signal to determine whether a memory transaction with a write command will require a burst operation to read data from primary values. In some examples, such as the example second transaction 308 and example fourth transaction 312, the write commands are partial writes. In such examples, the example memory controller circuitry 108 performs a burst operation to read a section of primary values before writing any transacted write data to the example memory 110. In other examples, the current memory transaction is a full write. In such examples, the example memory controller circuitry 108 may not read any sections of primary value data before writing transacted write data.

The example bandwidth estimator circuitry 202 determines whether a previous memory transaction corresponds to the same section of ECC values as the current memory transaction. (Block 608). To make the determination of block 608, the example bandwidth estimator circuitry 202 may access the example memory 210 to compare the address listed in the previous memory transaction to the address listed in the current memory transaction. If the example bandwidth estimator circuitry 202 determines a previous memory transaction corresponds to the same section of ECC values as the current memory transaction, (Block 608: Yes), the example machine readable instructions and/or operations 500 continue to block 612.

If the example bandwidth estimator circuitry 202 determines a previous memory transaction does not correspond to the same section of ECC values as the current memory transaction, (Block 608: No), the example bandwidth estimator circuitry 202 determines a number of bytes used by the memory controller circuitry 108 to access ECC values from memory 110. (Block 610). ECC values refer to data stored in the sections of memory that are used to identify and/or correct errors in the current memory transaction. For example, ECC values may be stored within the example ECC memory addresses 304 of FIG. 3. The example bandwidth estimator circuitry 202 may make the determination of block 610 based on information that includes but is not limited to the memory address listed in the memory transaction of block 502, the memory burst length, and the burst boundaries of the ECC memory values. If the example bandwidth estimator circuitry 202 determines a previous memory transaction does not correspond to the same section of ECC values as the current memory transaction, (Block 608: No), the example memory controller circuitry 108 may access a non-zero amount of ECC values from memory, regardless of whether the current memory transaction is a read operation, partial write operation, or full write operation.

The example bandwidth estimator circuitry 202 determines whether the current memory transaction is a write operation. (Block 612). If the current memory transaction is not a write operation, (Block 612: No), the example machine readable instructions and/or operations 500 proceed to block 616.

If the current memory transaction is a write operation, (Block 612: Yes), the example bandwidth estimator circuitry 202 determines a number of bytes used to store modified primary and ECC values in memory 110. (Block 614). To store the modified primary and ECC values in memory 110, the example memory controller circuitry 108 may write one or more sections of data to the primary memory addresses 302 where each section has a size described by the memory burst length value of block 604. The example memory controller circuitry 108 may also write one or more sections of data to the ECC memory addresses 304.

The bandwidth estimator circuitry 202 estimates the total consumed bandwidth as a sum of the determinations of blocks 606, 610, and blocks 614. (Block 616). That is, the consumed bandwidth is based on at least the amount of data required to access primary values from memory, the amount of data required to access ECC values from memory, and the amount of data required to store modified primary and ECC values in memory. The example machine readable instructions and/or operations 500 return to block 506 after block 616.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus and articles of manufacture described herein improve the accuracy of memory transactions throttle times. Example rate limiter circuitry 104A, 104B, 104C prevent the transmission of additional memory transactions based on a consumed bandwidth that represents the amount of data required for memory controller circuitry to process a first memory transaction. As a result, the example rate limiter circuitry 104A, 104B, 104C may reduce the risk of memory controller overload and/or bus utilization when compared to a previous solution that throttles memory transactions based on a transacted bandwidth.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A device comprising:
    bandwidth estimator circuitry configured to:
        obtain a first memory transaction including a transacted amount of data; and
        determine a consumed bandwidth associated with the first memory transaction based on the transacted amount of data of the first memory transaction; and
    gate circuitry configured to:
        permit transmission of the first memory transaction to a memory controller circuitry;
        determine whether to gate a second memory transaction generated by a source of the first memory transaction based on the consumed bandwidth of the first memory transaction; and
        based on a determination to gate the second memory transaction, prevent transmission of the second memory transaction for an amount of time based on the consumed bandwidth.

2. The device of claim 1, wherein the bandwidth estimator circuitry is further configured to determine the consumed bandwidth based on an amount of data accessed in a memory burst.

3. The device of claim 2, wherein:
    the first memory transaction further includes a memory address; and
    the bandwidth estimator circuitry is further configured to:
        determine whether the transacted amount of data and memory address are misaligned with a boundary of the memory burst; and
        determine the consumed bandwidth based on the determination.

4. The device of claim 2, wherein:
    the first memory transaction is a partial write operation;
    the memory controller circuitry is configured to:
        based on the first memory transaction,
            read a first amount of data in a first memory burst;
            modify the first amount of data based on the transacted amount of data; and
            write the modified first amount of data in a second memory burst; and
    to determine the consumed bandwidth, the bandwidth estimator circuitry is configured to determine the consumed bandwidth based on the first amount of data and the modified first amount of data.

5. The device of claim 4, wherein:
    the memory controller circuitry is configured to:
    based on the first memory transaction,
        read a second amount of data in a third memory burst, the second amount of data including an Error Correction Code (ECC) corresponding to the first memory transaction;
        modify the second amount of data to update the ECC; and
        write the modified second amount of data in a fourth memory burst; and
    to determine the consumed bandwidth, the bandwidth estimator circuitry is configured to determine the consumed bandwidth based on the second amount of data and the modified second amount of data, in addition to the first amount of data and the modified first amount of data.

6. The device of claim 5, wherein:
    the bandwidth estimator circuitry is further configured to:
        log the first memory transaction;
        determine, based on the log, that the ECC corresponding to the first memory transaction and an ECC corresponding to the second memory transaction are both included in the second amount of data accessed by the memory controller circuitry in the third memory burst; and
        determine a consumed bandwidth of the second memory transaction based on information other than the second amount of data.

7. The device of claim 1, further including transaction limiter circuitry configured to:
    obtain an allocated number of bytes per unit of time that the source of the first memory transaction is permitted to transmit to the memory controller circuitry; and
    determine the amount of time based on the consumed bandwidth and the allocated number of bytes per unit of time.

8. A method comprising:
    obtaining a first memory transaction that includes a transacted amount of data;
    determining a consumed bandwidth associated with the first memory transaction based on the transacted amount of data of the first memory transaction;
    permitting transmission of the first memory transaction;
    determining whether to gate a second memory transaction generated by a source of the first memory transaction based on the consumed bandwidth of the first memory transaction; and
    based on determining to gate the second memory transaction, preventing transmission of the second memory transaction for an amount of time determined by the consumed bandwidth.

9. The method of claim 8, further including determining the consumed bandwidth based on an amount of data accessed in a memory burst.

10. The method of claim 9, wherein:
    the first memory transaction includes a memory address; and
    the method further includes:
        determining whether the transacted amount of data and memory address are misaligned with a boundary of the memory burst; and
        determining the consumed bandwidth based on the determination.

11. The method of claim 9, further including:
    reading a first amount of data in a first memory burst;
    modifying the first amount of data based on the transacted amount of data; and
    writing the modified first amount of data in a second memory burst, wherein determining the consumed bandwidth comprises determining the consumed bandwidth based on the first amount of data and the modified first amount of data.

12. The method of claim 11, further including:
reading a second amount of data in a third memory burst, the second amount of data associated with an Error Correction Code (ECC) corresponding to the first memory transaction;
modifying the second amount of data to update the ECC; and
writing the modified second amount of data in a fourth memory burst,
wherein determining the consumed bandwidth comprises determining the consumed bandwidth based on the second amount of data and the modified second amount of data, in addition to the first amount of data and the modified first amount of data.

13. The method of claim 12, further including:
logging the first memory transaction;
determining, based on the log, that the ECC corresponding to the first memory transaction and an ECC corresponding to the second memory transaction are both included in the second amount of data accessed in the third memory burst; and
determining a consumed bandwidth of the second memory transaction based on information other than the second amount of data.

14. The method of claim 8, further including:
obtaining an allocated number of bytes per unit of time that the source of the first memory transaction is permitted to transmit; and
determining the amount of time based on the consumed bandwidth and the allocated number of bytes per unit of time.

15. A device comprising:
transaction source circuitry configured to generate a first memory transaction and a second memory transaction, wherein the first memory transaction includes a transacted amount of data;
bandwidth estimator circuitry configured to:
 obtain the first memory transaction; and
 determine a consumed bandwidth associated with the first memory transaction based on the transacted amount of data of the first memory transaction; and
gate circuitry configured to:
 permit transmission of the first memory transaction to a memory controller circuitry; and
 determine whether to gate the second memory transaction generated by the transaction source circuitry based on the consumed bandwidth of the first memory transaction;
 based on a determination to gate the second memory transaction, prevent transmission of the second memory transaction for an amount of time determined by the consumed bandwidth; and
the memory controller circuitry configured to:
 process the first memory transaction; and
 provide results of the first memory transaction to the transaction source circuitry.

16. The device of claim 15, wherein the transaction source circuitry is an Intellectual Property core.

17. The device of claim 15, wherein the bandwidth estimator circuitry is further configured to determine the consumed bandwidth based on an amount of data accessed in a memory burst.

18. The device of claim 17, wherein:
the first memory transaction includes a memory address; and
the bandwidth estimator circuitry is further configured to:
 determine whether the transacted amount of data and memory address are misaligned with a boundary of the memory burst; and
 determine the consumed bandwidth based on the determination.

19. The device of claim 15, wherein:
the first memory transaction is a partial write operation;
to process the first memory transaction, the memory controller circuitry is configured to:
 obtain a first amount of data in a first memory burst;
 modify the first amount of data based on the transacted amount of data of the first memory transaction;
 write the modified first amount of data in a second memory burst;
 obtain a second amount of data in a third memory burst, the second amount of data associated with an Error Correction Code (ECC) corresponding to the first memory transaction;
 modify the second amount of data to update the ECC; and
 write the modified second amount of data in a fourth memory burst; and
the bandwidth estimator circuitry is further configured determine the consumed bandwidth based on the first memory burst, the second memory burst, the third memory burst, and the fourth memory burst.

20. The device of claim 15, wherein:
the first memory transaction is a full write operation;
to process the first memory transaction, the memory controller circuitry is configured to:
 write the transacted amount of data of the first memory transaction in a first memory burst; and
 obtain a first amount of data in a second memory burst, the first amount of data associated with an Error Correction Code (ECC) corresponding to the first memory transaction;
 modify the first amount of data to update the ECC; and
 write the modified first amount of data in a third memory burst; and
the bandwidth estimator circuitry is further configured to determine the consumed bandwidth based on the first memory burst, the second memory burst, and the third memory burst.

* * * * *